Wm. H. Seymour and A. Palmer.
Harvester-Rake.
No. 75,801. Patented Mar. 24. 1868.
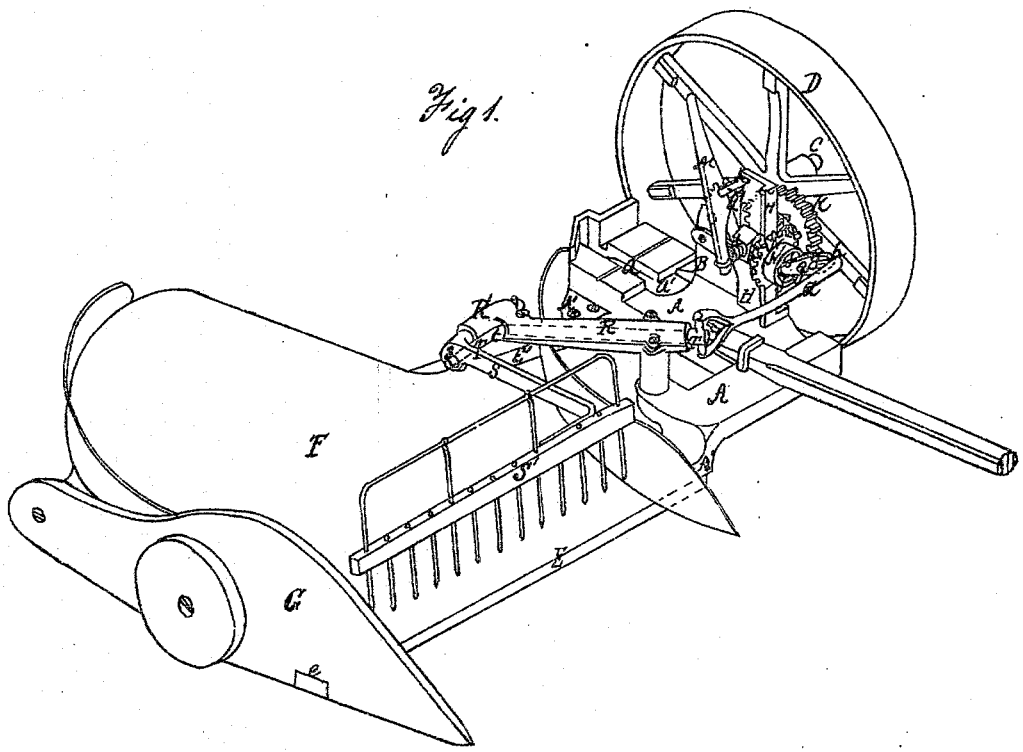
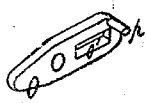
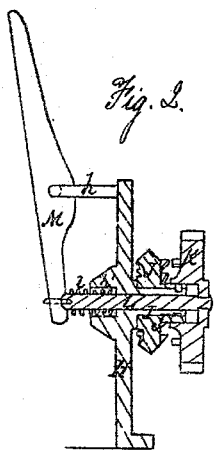

United States Patent Office.

WILLIAM H. SEYMOUR AND AARON PALMER, OF BROCKPORT, NEW YORK.

Letters Patent No. 75,801, dated March 24, 1868.

IMPROVEMENT IN HARVESTER-RAKES.

*The Schedule referred to in these Letters Patent and making part of the same.*

TO ALL WHOM IT MAY CONCERN:

Be it known that we, WILLIAM H. SEYMOUR and AARON PALMER, of Brockport, county of Monroe, and State of New York, have invented certain new and useful Improvements in Automatic Rakes for Harvesters; and we do hereby declare the following to be a full, clear, and exact description of the same, reference being had to the accompanying drawings, making a part of this specification, in which—

Figure 1 is a perspective view of a reaper having our improved rake applied.

Figure 2 is a vertical section through the gear-standard and counter-shaft, showing the arrangement of the driving-gear and shipping-lever.

Figure 3 is a perspective view of the driving bevel-wheel and tubular crank-pinion detached; and Figure 4 is a perspective view of the slotted crank-lever detached.

Similar letters of reference denote corresponding parts in all the figures.

Our invention consists in a novel arrangement of means for imparting the necessary movement to a vibrating sweep-rake, and for giving to said rake an increased velocity at the beginning of its delivery stroke, as hereinafter explained.

In the accompanying drawings, A represents the main frame, which may be made or cast in one piece, in form substantially as represented in fig. 1, and is provided with a perforated standard or upright, B, to which the axle C of the main drive-wheel D is attached in any suitable manner. Said frame is also provided with suitable slots $a\ a'$, to receive the multiplying bevel-wheel and pinion on suitable shafts, mounted on the main frame, and from which motion is imparted to the cutter in a manner that will be readily understood. E is the finger-bar, bolted at its inner end to an arm, A', of the main frame, and F is the platform attached at its forward edge to the bar E, in any usual manner, and supported in rear upon an obliquely-arranged bar, E', secured at its inner end to a rear-projecting arm, A'', of the main frame, and at its outer end to the rear end of the dividing-board G, to which the outer end of the finger-bar is also connected, as shown at $e$, fig. 1. The platform F is made in quadrant or nearly quadrant form, and is provided at its inner and outer sides or edges with grain-guards or fenders, conforming in curvature to the path of the vibrating-rake, hereinafter described, and which assist the rake in the proper discharge of the grain. H is a gear-standard, which is bolted or otherwise firmly secured to frame A and standard B. Said standard H may be made of an angular form, in horizontal section, for purposes of lightness and strength, and is provided with a tubular stud or axle, I, upon which is mounted a bevel-wheel, J, armed with a tubular sleeve, J', upon which is loosely mounted a spur-wheel, K, which meshes with and receives its motion from a spur-wheel, K', attached to and rotating with the main drive-wheel D. The spur-wheel K is adapted to slide on sleeve J', and has its inner face provided with a ring or series of inclined teeth, or a half clutch matching with a corresponding half clutch on the adjacent face of the bevel-wheel J. The inclined faces or sides of these clutches are so arranged that when the machine is backed the teeth of clutch on wheel K will slip by those on the bevel-wheel J, and allow the latter to remain stationary. L is a stationary shaft or rod, mounted in the tubular stud or axle of standard H, upon the outer end of which rod or shaft the spur-wheel K is mounted, or so attached thereto as to turn freely thereon. The inner end of rod or shaft L is connected to a lever, M, which has its fulcrum in an arm or rod, $h$, attached to the gear-standard, as shown in figs. 1 and 2. $l$ is a spiral spring, applied to the shaft or rod L, between the standard H and lever M, made, in this instance, in a spiral form, surrounding the shaft at its inner end, and located in a socket, $h'$, formed in a standard, H, to receive it. The shaft or rod L is adapted to slide in its bearing in the gear-standard, and is operated by spring $l$ and lever M, to clutch and unclutch the wheel K and bevel-wheel J; the spring serving to keep said wheel in gear during the forward motion of the machine, except when thrown out by the driver by operating lever M, and allowing the wheel K to rotate without turning the bevel-wheel J, when the machine is backed, in the manner explained. N is a tubular bevel-pinion, mounted on a stationary stud, $j$, on standard H, and gearing with and receiving its motion from bevel-wheel J. Said pinion N is armed with a sleeve, N', and crank-pin $n$, as represented in fig. 3. O is a crank-arm, attached to and turning upon a fixed eccentric-stud or pin, $j'$, on stud $j$, and provided with an elongated slot, $o'$, in which the crank-pin $n$ works, and through which the rotation of the eccentric-crank arm is effected in a manner that will be readily understood. $p$ is a crank-pin on the swinging end of arm O, to which one end of the rake-pitman Q is attached by means of a ball and socket, or other suitable joint. R is a tubular swinging crane or frame, made in two or more parts, bolted or otherwise properly secured to each other, and mounted in suitable bearings in or upon a fixed upright stud or pivot on the frame A. The rear or swinging end of said frame or crane is provided with an angular arm, R', also made tubular or otherwise, adapted to receive and afford suitable bearings for the angular rake-arm S, to which the rake-head S', made in any desired or usual form, is attached. The rake-arm is slotted at or near its heel or pivoted end, as shown at s, said slot being slightly elongated, to adapt it to receive and admit of slight play of a bent rod or rock-shaft, T, through which the rake receives it rising and falling and also its vibrating movements. Shaft or rod T is mounted in the tubular frame R or its equivalent, and is bent or deflected at its rear end, as shown at t, passing out through a perforation in frame or crane R, in advance of the rake-pivot therein, and extending into the slot s in the rake-arm. The forward end of the rod or shaft T is provided with a cross-head or arm, to which the outer forked end of pitman Q is attached, as shown in fig. 1.

The operation is as follows: Motion is communicated from the drive-wheel to the eccentric-crank arm or lever O, through the spur-gears K K', bevel-wheel J, and bevel-crank pinion N, and by means of the pitman connected therewith, and with the forward end of the angular rod or shaft T, mounted in the tubular rake-frame or crane, the rake is vibrated or moved back and forth over the platform in a manner that will be readily understood. The movement of the crank-arm in a vertical or nearly vertical plane, in connection with the manner of attaching the forked outer end of the pitman to the cross-head of shaft T, or its equivalent, gives to said shaft a rocking or rolling motion in its bearings in crane R, as the crank-pin rises and falls in passing its dead-centres in its revolution, and thereby, through the bent or deflected arm t working in slot s in the rake-arm, serves to give the necessary rising and falling movements of the rake. The drawing, fig. 1, represents the crank-arm in position, rising to pass its outer centre, and the rake in position, just descending upon the forward edge of the platform to sweep the grain therefrom during the outward throw of the crank-arm. When the rake has swept the platform, and the outward throw of the crank-arm is nearly completed, the descent of the crank-arm rolls the bent shaft inward, throwing up the bent arm t, which carries the rake-arm with it, causing the rake to assume an elevated position for its return stroke. The eccentric arrangement of the pivot or shaft of the slotted crak-arm relative to its driving-crank pin n, causes said pin n to move inward in the slot o', toward the fixed pivot on which the crank-arm turns, thereby shortening the fulcrum of said arm, and elongating its crank-end relative to crank-pin n, as the latter rises in its revolution, and at the instant the rake descends upon the platform to sweep the grain therefrom. The crank-pin n, moving at a uniform speed, and acting, at the moment of rising, at a point nearer to the fixed centre upon the lengthened crank-arm, in the manner explained, serves to give an increased speed to the rake-driving crank-arm, and a more rapid movement is thus given to the rake at the commencement of its delivery-stroke.

It will be obvious that the form and construction of the several parts hereinabove mentioned may be varied to suit the different arrangements thereof, in adapting our improvements for use in different constructions of harvesting-machines to which they may be applied, without departing from our invention.

Having now described our invention, what we claim, is—

1. The rake-arm mounted in the swinging end of the rake-frame or crane, and provided with a slot or perforation, substantially as and for the purpose described.

2. The swinging-rake frame or crane, in combination with the angular rod or rock-shaft and rake-arm, substantially as described.

3. The angular rod or shaft, in combination with the rake-arm, operating as described.

4. Operating the bent arm or rock-shaft to raise and depress the rake, by means of the crank and pitman, substantially as described.

5. The eccentric slotted crank-arm, or its equivalent, whereby the speed of the rake is varied, as described.

6. The shipping-lever and spring, in combination with the rake-gearing on standard H, substantially as described.

WILLIAM H. SEYMOUR,
AARON PALMER.

Witnesses:
WILLIAM STOUGHTON,
GEO. H. ALLEN.